(12) United States Patent
Choi

(10) Patent No.: US 11,029,138 B2
(45) Date of Patent: Jun. 8, 2021

(54) DROP-OUT MOUNTING STRUCTURE FOR WHEEL ALIGNMENT

(71) Applicants: Hyundai Motor Company, Seoul (KR); KIA Motors Corporation, Seoul (KR)

(72) Inventor: Jungnam Choi, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 221 days.

(21) Appl. No.: 16/201,260

(22) Filed: Nov. 27, 2018

(65) Prior Publication Data

US 2019/0376778 A1    Dec. 12, 2019

(30) Foreign Application Priority Data

Jun. 8, 2018    (KR) .................. 10-2018-0065773

(51) Int. Cl.
*G01B 5/255*    (2006.01)
*G01B 5/25*    (2006.01)

(52) U.S. Cl.
CPC ............... *G01B 5/255* (2013.01); *G01B 5/25* (2013.01); *G01B 2210/10* (2013.01)

(58) Field of Classification Search
CPC ...... G01B 5/255; G01B 5/25; G01B 2210/10; G01B 5/0025; B62K 19/18; B62K 25/02
USPC .......................................................... 33/645
See application file for complete search history.

(56) References Cited

U.S. PATENT DOCUMENTS

| 5,082,303 | A | * | 1/1992 | Duehring | B62K 25/02 |
| | | | | | 280/284 |
| 5,096,215 | A | * | 3/1992 | Chonan | B62K 25/02 |
| | | | | | 280/281.1 |
| 5,694,699 | A | * | 12/1997 | Folson | G01B 5/0025 |
| | | | | | 33/533 |
| 5,957,244 | A | * | 9/1999 | Turner | B62L 1/005 |
| | | | | | 188/24.11 |
| 5,984,423 | A | * | 11/1999 | Becker | B60B 27/023 |
| | | | | | 301/110.5 |
| 6,267,399 | B1 | * | 7/2001 | Buckmiller | B29C 53/824 |
| | | | | | 280/274 |
| 8,899,606 | B2 | * | 12/2014 | Cocalis | B62K 3/02 |
| | | | | | 280/281.1 |
| 9,545,971 | B2 | * | 1/2017 | Beutner | B62K 19/16 |
| 10,518,835 | B2 | * | 12/2019 | Choi | B62K 19/22 |

(Continued)

FOREIGN PATENT DOCUMENTS

| WO | WO-9850268 A1 | * | 11/1998 | ............ B62K 25/02 |
| WO | WO-9911514 A1 | * | 3/1999 | ............. B62L 1/005 |
| WO | WO-9917942 A1 | * | 4/1999 | .......... B60B 27/023 |

*Primary Examiner* — Yaritza Guadalupe-McCall
(74) *Attorney, Agent, or Firm* — Brinks, Gilson & Lione

(57) ABSTRACT

A drop-out mounting structure for wheel alignment is disclosed. The disclosed drop-out mounting structure for the wheel alignment according to an aspect of the present disclosure for mounting a drop-out member as a wheel mounting unit to a bicycle frame through a bolt in a state that the drop-out member may be set according to a predetermined reference position includes a wheel alignment unit provided to be in spherical contact with a bolt fastening portion of the drop-out member and the frame as a male and female type and performing wheel alignment according to deformation of the frame.

19 Claims, 12 Drawing Sheets

(56) References Cited

U.S. PATENT DOCUMENTS

| | | | |
|---|---|---|---|
| 2011/0042917 A1* | 2/2011 | Cleveland | B62K 19/24 |
| | | | 280/288 |
| 2015/0259026 A1* | 9/2015 | Norstad | B62K 25/02 |
| | | | 280/284 |
| 2018/0065704 A1* | 3/2018 | Choi | B62M 9/16 |
| 2018/0111656 A1* | 4/2018 | Choi | B62K 19/22 |
| 2018/0154976 A1* | 6/2018 | Choi | B62K 19/20 |
| 2018/0170477 A1* | 6/2018 | Choi | B62K 25/02 |
| 2018/0346054 A1* | 12/2018 | Choi | B62K 19/20 |
| 2019/0185101 A1* | 6/2019 | Choi | B62K 19/20 |
| 2019/0376778 A1* | 12/2019 | Choi | B62K 19/18 |
| 2019/0389530 A1* | 12/2019 | Choi | B62K 19/20 |

\* cited by examiner (a)

(b)

(a)

(b)

DROP-OUT MOUNTING STRUCTURE FOR WHEEL ALIGNMENT

CROSS-REFERENCE TO RELATED APPLICATION

This application claims priority to and the benefit of Korean Patent Application No. 10-2018-0065773, filed on Jun. 8, 2018, the entire contents of which are incorporated herein by reference.

FIELD

An aspect of the present disclosure relates to a frame structure of a bicycle. More particularly, the present disclosure relates to a frame mounting structure of a drop-out assembly as a wheel mounting unit for mounting a wheel to a bicycle frame.

BACKGROUND

The statements in this section merely provide background information related to the present disclosure and may not constitute prior art.

A typical bicycle frame includes a head tube, a seat tube, a top tube, a down tube, a seat stay, and a chain stay.

A steering wheel connection body is connected to an upper end portion of the head tube, and a front wheel rotary connection body is connected to a lower end portion of the head tube. A saddle connection body is connected to an upper end portion of a seat tube, and a chain drive body is connected to a lower end portion of the seat tube.

The top tube and the down tube connect and support the head tube and the seat tube, and the seat stay and the chain stay connect and support a rear wheel rotary connection body and the seat tube.

The bicycle frame may include both the top tube and the down tube, but, alternatively, one main tube (not shown) may be connected between the head tube and the seat tube.

The typical bicycle frame is manufactured by respectively cutting a top tube, a down tube, and a seat tube using a tube as a base material and then respectively welding them, but since it is difficult to automatically perform such manufacturing processes, productivity may deteriorate and manufacturing cost may increase.

Therefore, research for improving production efficiency and durability of the bicycle frame through a process of manufacturing a bicycle frame by stamp-molding a plate member and then bonding left and right portions of the hot-stamped plate member has recently progressed.

On the other hand, in a technique for manufacturing a stamping bicycle frame of a tube shape by stamp-molding the left and right panels and welding them, it is difficult to precisely realize the alignment of the rear wheel by welding deformation of the frame. Accordingly, research on a structure that is capable of precisely controlling the alignment of the wheel on the stamping frame has progressed in the art.

Particularly, if the alignment of the wheel is changed by a twist of the left and right stays, a power loss increases, uneven wear of the tire occurs, and a one-sided direction load is concentrated, thereby the frame may be damaged due to fatigue.

The above information disclosed in this Background section is only for enhancement of understanding of the background of the disclosure and therefore it may contain information that does not form the prior art that is already known to a person of ordinary skill in the art.

SUMMARY

Aspects of the present disclosure provide a drop-out mounting structure for easily and correctly performing wheel alignment without correction of the frame and adjustment of the drop-out even if the deformation of the frame is generated by welding heat.

A disclosed drop-out mounting structure for wheel alignment according to an aspect of the present disclosure for mounting a drop-out member as a wheel mounting unit to a bicycle frame through a bolt in a state that the drop-out member may be set according to a predetermined reference position includes a wheel alignment unit provided to be in spherical contact with a bolt fastening portion of the drop-out member and the frame as a male and female type, and performing wheel alignment according to deformation of the frame.

For the drop-out mounting structure according to an aspect of the present disclosure, the drop-out members may be mounted to a stay frame of the bicycle frame in which both side panels that are stamp-molded are bonded by welding.

For the drop-out mounting structure according to an aspect of the present disclosure, the wheel alignment aligning unit may include: a concave spherical portion formed at one bolt fastening hole edge of the drop-out member and the frame; and a convex spherical portion formed at another bolt fastening hole edge of the drop-out member and the frame and in spherical contact with the concave spherical portion.

For the drop-out mounting structure according to an aspect of the present disclosure, the convex spherical portion may be in partial spherical contact with the concave spherical portion by the deformation of the frame.

In an aspect of the present disclosure, a drop-out mounting structure mounting a drop-out member as a wheel mounting unit to a bicycle frame through a bolt in a state that the drop-out member is set according to a predetermined reference position includes a wheel alignment unit provided between bolt fastening portions of the drop-out member and the frame and performing wheel alignment according to deformation of the frame, wherein the wheel alignment unit includes a protrusion pattern portion of which a part is crushed by the fastening force of the drop-out member and the frame due to the bolt.

For the drop-out mounting structure according to an aspect of the present disclosure, the protrusion pattern portion includes crush protrusions formed to be integrally protruded and separated along an edge direction at a bolt fastening hole edge surface of the drop-out member.

For the drop-out mounting structure according to an aspect of the present disclosure, the frame is made of a steel material, and the drop-out member is made of an aluminum material.

For the drop-out mounting structure according to an aspect of the present disclosure, the wheel alignment aligning unit includes a washer interposed between bolt fastening portions of the drop-out member and the frame and the protrusion pattern portion is respectively formed at both side surfaces of the washer.

For the drop-out mounting structure according to an aspect of the present disclosure, the frame and the drop-out member are made of a steel material, and the washer is made of an aluminum material and is provided in a ring shape having an inner space.

For the drop-out mounting structure according to an aspect of the present disclosure, the protrusion pattern portion includes crush protrusions formed to be integrally protruded and separated along an edge direction at both side surfaces of the washer.

Further, an aspect of the present disclosure provides a drop-out mounting structure mounting a drop-out member as a wheel mounting unit to a bicycle frame through a bolt in a state that the drop-out member is set according to a predetermined reference position, including a wheel alignment unit provided at bolt fastening portions of the drop-out member and the frame and performing wheel alignment according to the deformation of the frame, wherein the wheel alignment unit includes a concave spherical portion respectively formed at the bolt fastening hole edge on both side surfaces of the drop-out member and a washer installed to be in spherical contact with the concave spherical portion.

For the drop-out mounting structure according to an aspect of the present disclosure, the washer forms a convex spherical portion in spherical contact with the concave spherical portion at one side surface.

For the drop-out mounting structure according to an aspect of the present disclosure, one washer forms a flat surface supporting a head of the bolt at the other side surface.

For the drop-out mounting structure according to an aspect of the present disclosure, another washer forms the flat surface supporting the bolt fastening hole edge of the frame at the other side surface.

For the drop-out mounting structure according to an aspect of the present disclosure, the bolt is fastened to a weld nut provided at the inside of the frame by penetrating the washer hole of the washer and the bolt fastening hole of the drop-out member and the frame.

For the drop-out mounting structure according to an aspect of the present disclosure, the washer hole of the washer and the bolt fastening hole of the drop-out member are formed with a larger interior diameter than an exterior diameter of the bolt.

Further, an aspect of the present disclosure provides a drop-out mounting structure mounting a drop-out member as a wheel mounting unit to a bicycle frame through a bolt in a state that the drop-out member is set according to a predetermined reference position, including a wheel alignment unit provided at bolt fastening portions of the drop-out member and the frame and performing wheel alignment according to deformation of the frame, wherein the wheel alignment unit includes a first washer respectively installed at a washer mounting surface of the bolt fastening hole edge side on both side surfaces of the drop-out member and forming a concave spherical portion at the inner edge and a second washer installed to be in spherical contact with the concave spherical portion of each first washer.

For the drop-out mounting structure according to an aspect of the present disclosure, the first washer forms the concave spherical portion at one side surface and the flat surface supporting the washer mounting surface at the other side surface.

For the drop-out mounting structure according to an aspect of the present disclosure, the second washer forms a convex spherical portion in spherical contact with the concave spherical portion of the first washer at one side surface.

For the drop-out mounting structure according to an aspect of the present disclosure, one second washer forms the flat surface supporting the head of the bolt at the other side surface.

For the drop-out mounting structure according to an aspect of the present disclosure, the other second washer forms the flat surface supporting the bolt fastening hole edge of the frame at the other side surface.

For the drop-out mounting structure according to an aspect of the present disclosure, the bolt is fastened to a weld nut provided at the inside of the frame by penetrating the washer hole of the first and second washers and the bolt fastening hole of the drop-out member and the frame.

For the drop-out mounting structure according to an aspect of the present disclosure, the washer hole of the first and second washers and the bolt fastening hole of the drop-out member are formed with a larger interior diameter than an exterior diameter of the bolt.

For the drop-out mounting structure according to an aspect of the present disclosure, the drop-out member forms the bolt fastening hole disposed in a triangle structure.

The aspects of the present disclosure may easily and correctly perform the wheel alignment through the wheel alignment unit without separate correction of the stay frame and separate adjustment of the drop-out member even if the stay frame is deformed by welding heat when manufacturing the bicycle frame.

Further, effects that can be obtained or expected from aspects of the present disclosure are directly or suggestively described in the following detailed description. That is, various effects expected from aspects of the present disclosure will be described in the following detailed description.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
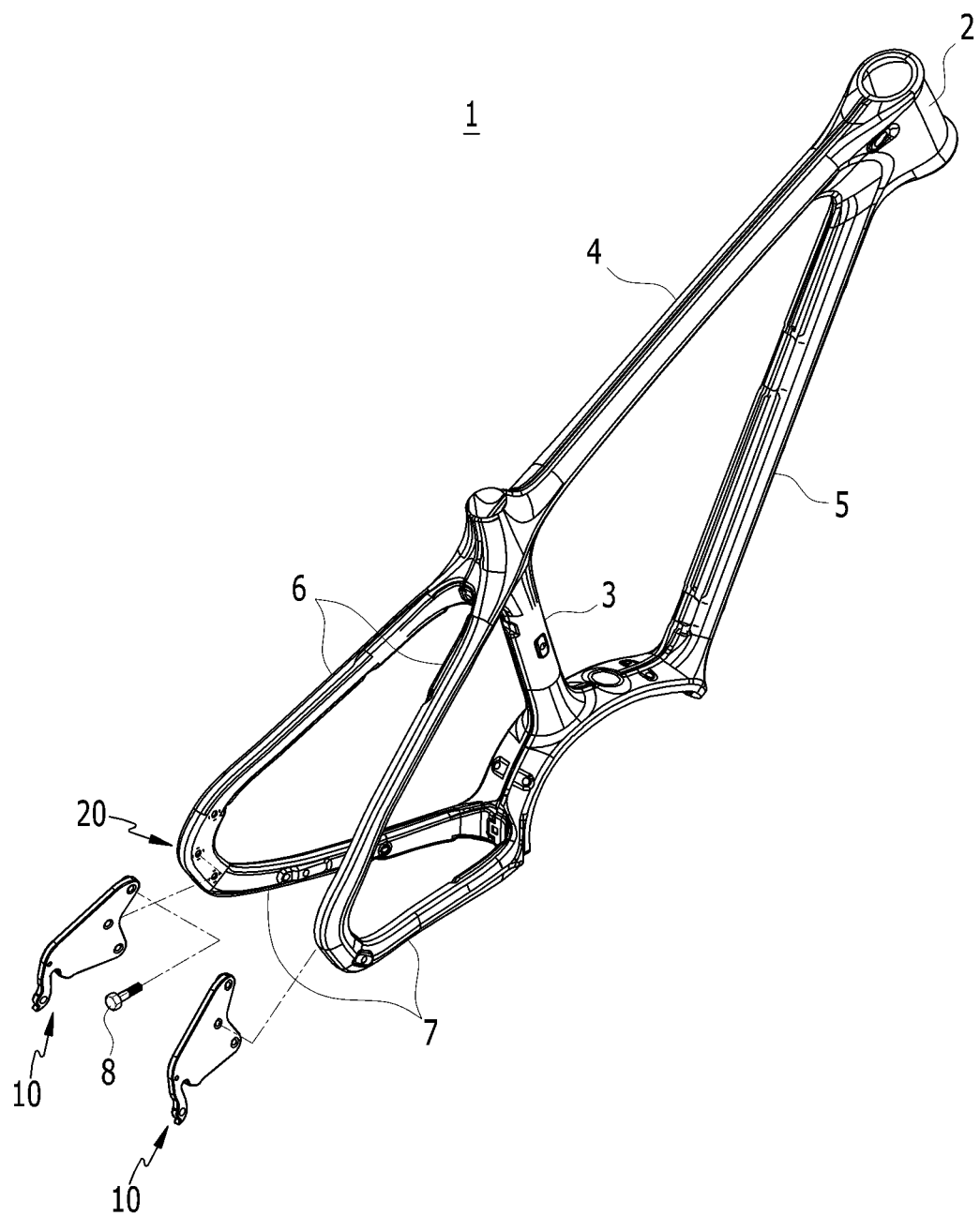
FIG. 1 is a perspective view of an example of a bicycle frame to which a drop-out mounting structure is applied.

The drawings described herein are for illustration purposes only and are not intended to limit the scope of the present disclosure in any way.

DETAILED DESCRIPTION OF THE ASPECTS

The following description is merely in nature and is not intended to limit the present disclosure, application, or uses. It should be understood that throughout the drawings, corresponding reference numerals indicate like or corresponding parts and features.

As those skilled in the art would realize, the described aspects may be modified in various different ways without departing from the spirit or scope of the present disclosure.

The size and thickness of each configuration shown in the drawings are arbitrarily shown for better understanding and ease of description, but the present disclosure is not limited thereto, and the thickness of layers, films, panels, regions, etc., may be exaggerated for clarity.

In the following detailed description, names of constituent elements which are in the same relationship are divided into "first", "second", and the like, but the present disclosure is not limited to the order in the following description.

In addition, unless explicitly described to the contrary, the word "comprise" and variations such as "comprises" or "comprising" will be understood to imply the inclusion of stated elements but not the exclusion of any other elements.

In addition, the terms " . . . unit", " . . . means", " . . . part", and " . . . member" described in the specification mean units of a general configuration performing at least one function or operation.

FIG. 1 is a perspective view of an example of a bicycle frame to which a drop-out mounting structure according to an aspect of the present disclosure is applied.

Referring to FIG. 1, a drop-out mounting structure for wheel alignment according to aspects of the present disclosure may be applied to a bicycle frame 1. Furthermore, the drop-out mounting structure for the wheel alignment according to aspects of the present disclosure may be applied to the bicycle frame 1 made of in a shape of a closed section by welding left and right both side panels that are respectively stamping-molded to a predetermined shape.

For example, the above-described bicycle frame 1 may be configured of a head tube 2, a seat tube 3, a top tube 4, a down tube 5, left and right seat stays 6, and left and right chain stays 7.

The bicycle frame 1 having such a configuration may be configured of a stamping frame of a tube shape in which left and right panels are respectively stamp-molded in a predetermined shape and the stamp-molded left and right panels are assembled.

However, the scope of the present disclosure is not limited to the bicycle frame 1 manufactured by assembling both side panels that are stamp-molded in the predetermined shape to each other, and a technical scope of the present disclosure is also applicable to the bicycle frame manufactured by welding separately cut tubes.

In the above, the bicycle frame 1 may be composed of one frame or two or more divided frames. Also, the bicycle frame 1 may include various accessory components such as various brackets, a colorant, a rib, a block, etc. for mounting known technology bicycle parts.

However, since the various accessory components to mount the various parts to the bicycle frame 1, the above-mentioned various accessory components are collectively referred to as the bicycle frame 1 except for an exceptional case in an aspect of the present disclosure.

On the other hand, in the above-mentioned bicycle frame 1, the left seat stay 6 is integrally connected to the left chain stay 7, and the right seat stay 6 is integrally connected to the right chain stay 7. Here, the left and right seat stays 6 are connected to the seat tube 3, and the left and right chain stays 7 are connected to a rear wheel rotary connection body.

Also, in the drop-out mounting structure for the wheel alignment according to aspects of the present disclosure as above-described, a drop-out member 10 as a wheel mounting unit is mounted at a position where the left and right seat stays 6 and chain stays 7 meet.

Hereinafter, a part where the drop-out member 10 is mounted may be referred to as "a stay frame 20" for convenience. Also, the drop-out member 10 may be respectively mounted at the left and right stay frames 20, and an example in which the drop-out member 10 may be mounted at any one stay frame 20 is described hereinafter. Also, in the drawing, the shapes of the drop-out members 10 mounted at the left and right stay frames 20 may be the same, even when drop-out members 10 of different shapes from each other may be mounted at the left and right stay frames 20.

Here, the drop-out member 10 may be fastened with the stay frame 20 through a bolt 8. An axle insertion groove where an axle of a wheel hub is inserted to be mounted is formed in the drop-out member 10, and the axle insertion groove has a structure that is opened downward, and is inclined forward at a predetermined angle.

On the other hand, as the bicycle frame 1 may be manufactured by welding both panels that are stamp-molded, the stay frame 20 to which the drop-out member 10 is mounted may be deformed by welding heat.

Figure 2:
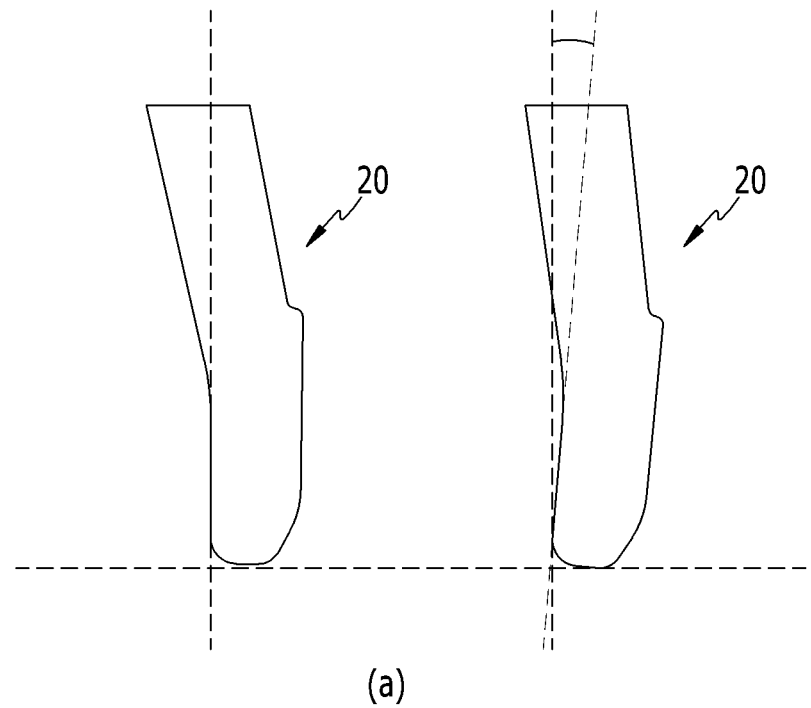
FIG. 2 is a schematic view showing a deformation state of a stay frame to which a drop-out mounting structure is applied.
Figure 2:
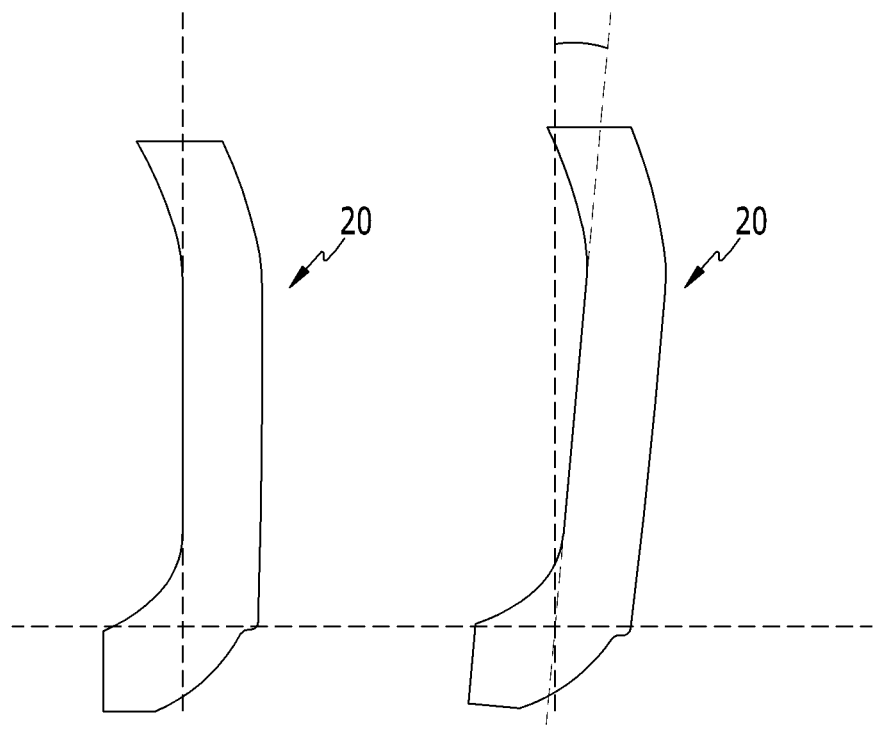

The stay frame 20 may be deformed by the welding heat as shown in FIG. 2 as an example. That is, as shown in FIG. 2(a), the part where the drop-out member 10 is formed (referring to FIG. 1) may be deformed in a forth and back direction (an X-axis direction) due to the welding heat. Also, as shown in FIG. 2(b), the part where the drop-out member 10 is formed may be deformed in a height direction (a Z-axis direction) due to the welding heat.

Accordingly, in an aspect of the present disclosure, when a reference position (reference coordinates of the X and Z axes) of the drop-out member 10 is deviated by the deformed stay frame 20, the wheel alignment of the rear wheel must be performed by correcting the stay frame 20 or controlling the reference position of the drop-out member 10.

Accordingly, the drop-out mounting structure for the wheel alignment according to aspects of the present disclosure is made of a structure that is capable of performing the wheel alignment without the correction of the stay frame 20 and the control of the drop-out member 10 even if the deformation of the stay frame 20 is generated due to the welding heat.

Furthermore, the aspects of the present disclosure provide the drop-out mounting structure of which the drop-out member 10 is mounted at the drop-out mounting unit of the stay frame 20 through the bolt 8 and the wheel alignment is performed corresponding to the deformation of the stay frame 20 in the state that the drop-out member 10 may be set (fixed) to be suitable at a predetermined reference position (the reference coordinates of the X and Z axes) through a standard (reference) jig (not shown in a drawing).

Figure 3:
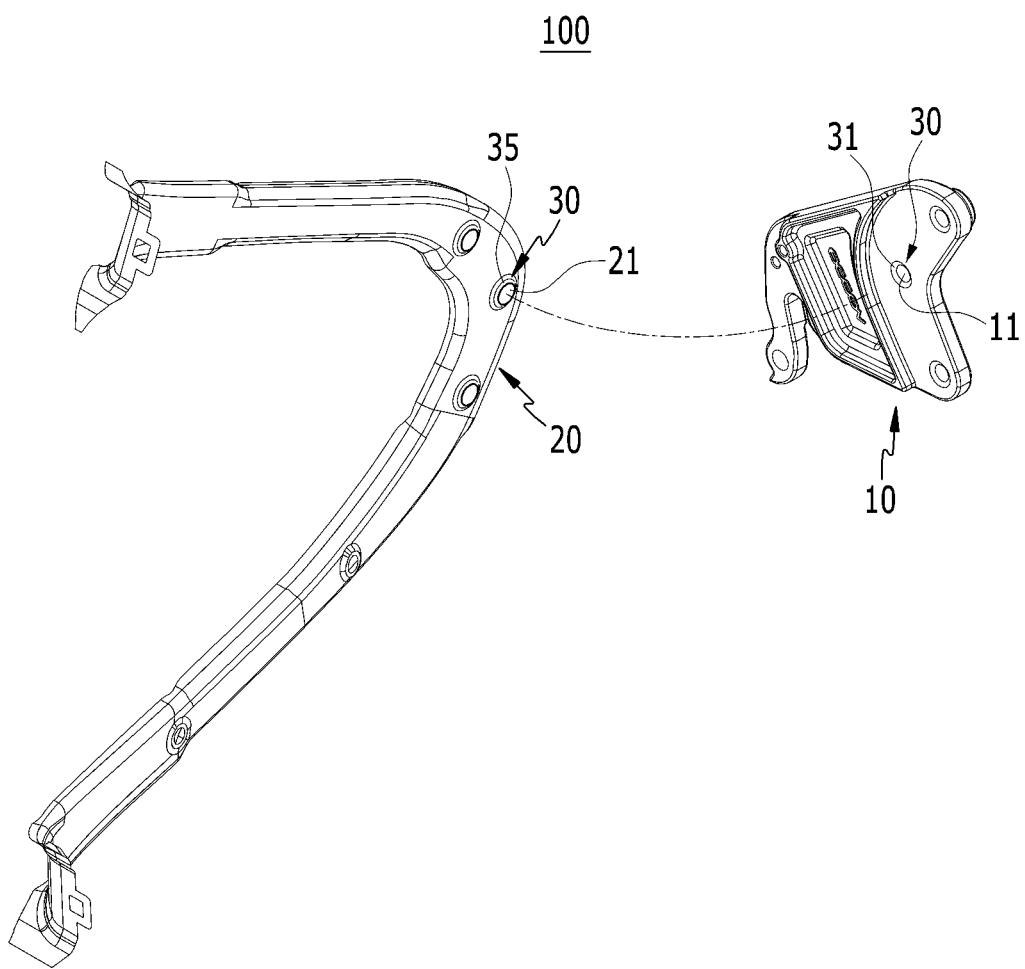
FIG. 3 is an exploded perspective view of a drop-out mounting structure for wheel alignment according to a first aspect of the present disclosure.
Figure 4:
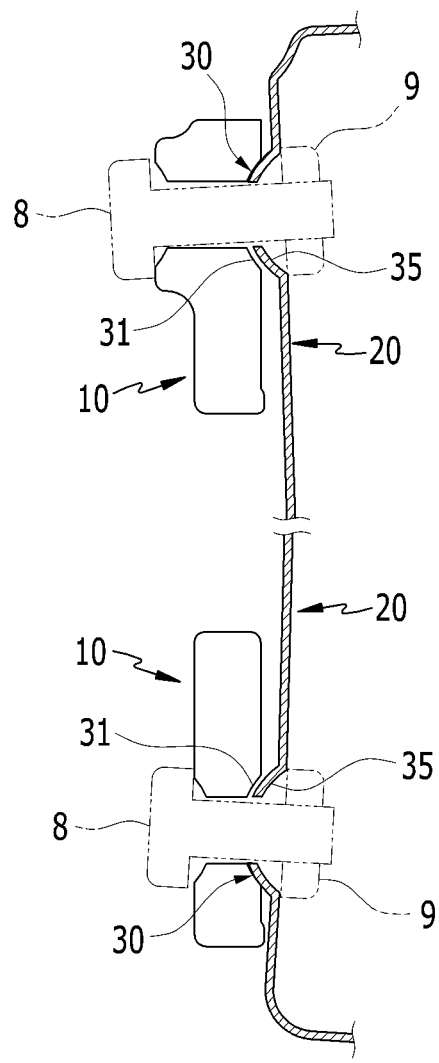
FIG. 4 is an assembled cross-sectional schematic diagram showing a drop-out mounting structure for wheel alignment according to a first aspect of the present disclosure.
Figure 4:
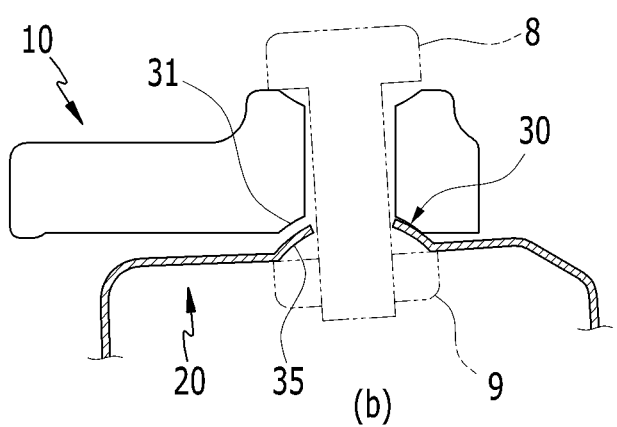

FIG. 3 is an exploded perspective view of a drop-out mounting structure for wheel alignment according to a first aspect of the present disclosure, and FIG. 4 is an assembled cross-sectional schematic diagram showing a drop-out mounting structure for wheel alignment according to a first aspect of the present disclosure in different directions from each other.

Referring to FIG. 3 and FIG. 4, the drop-out mounting structure 100 for the wheel alignment according to the first aspect of the present disclosure includes a wheel alignment unit 30 for performing the wheel alignment according to the deformation of the stay frame 20.

That is, the wheel alignment unit 30 corresponds to the deformation of the stay frame 20, and may be used to perform the wheel alignment by fastening the drop-out member 10 and the stay frame 20 through the bolt 8.

In an aspect of the present disclosure, the wheel alignment unit 30 is provided to be in spherical contact with the bolt fastening portion of the drop-out member 10 and the stay frame 20 as a male and female type.

The wheel alignment unit 30 includes a concave spherical portion 31 formed at one bolt fastening portion of the drop-out member 10 and the stay frame 20, and a convex spherical portion 35 formed at the other bolt fastening portion.

Here, the concave spherical portion 31 may be formed at the bolt fastening portion of the drop-out member 10, and the convex spherical portion 35 may be formed at the bolt fastening portion of the stay frame 20. Also, the concave spherical portion 31 may be formed at the bolt fastening portion of the stay frame 20, and the convex spherical portion 35 may be formed at the bolt fastening portion of the drop-out member 10.

However, in the drawing and hereinafter, an example in which the concave spherical portion 31 is formed at the bolt fastening portion of the drop-out member 10 and the convex spherical portion 35 is formed at the bolt fastening portion of the stay frame 20 is described.

On the other hand, the drop-out member 10 and the stay frame 20 may have bolt fastening holes 11 and 21 as the bolt fastening portion for fastening the bolt 8. For example, three bolt fastening holes 11 and three bolt fastening holes 21 are formed at the drop-out member 10 and the stay frame 20, respectively. Also, a weld nut 9 connected to the bolt fastening holes 21 may be provided inside the stay frame 20. The weld nut 9 is fastened with the bolt 8 penetrating the bolt fastening holes 21 and is welded to the inner surface of the stay frame 20.

Here, the bolt fastening holes 11 of the drop-out member 10 may be disposed in a structure of an equilateral triangle or an isosceles triangle to realize more accurate wheel alignment for the stay frame 20.

In the above, the concave spherical portion 31 is formed at the bolt fastening hole 11 edge portion of the drop-out member 10. The concave spherical portion 31 is formed at the bolt fastening hole 11 edge portion of the surface facing the stay frame 20. The concave spherical portion 31 forms a spherical surface with a hemisphere shape that is substantially concave to the inside of the hole thereof at the edge portion of the bolt fastening hole 11.

Also, the convex spherical portion 35 is formed at the bolt fastening hole 21 edge portion of the stay frame 20 by corresponding to the concave spherical portion 31 of the drop-out member 10. The convex spherical portion 35 may be formed at the bolt fastening hole 21 edge portion of the surface facing the concave spherical portion 31 of the drop-out member 10.

The convex spherical portion 35 forms the spherical surface with the hemisphere shape that may be substantially concave to the inside of the hole thereof at the edge portion of the bolt fastening hole 21, thereby the spherical surface contact is possible with the spherical surface of the concave spherical portion 31.

For example, the convex spherical portion 35 may be formed by cutting the upper portion of the hemisphere thereof at the hemisphere shape molded to be convex from the inside of the stay frame 20 to the outside surface.

The above-configured drop-out mounting structure 100 according to the first aspect of the present disclosure will now be described in detail with reference to the above-disclosed drawings.

First, in an aspect of the present disclosure, the left and right drop-out members 10 forming the axle insertion groove and the bolt fastening holes 11 and forming the concave spherical portion 31 on the bolt fastening holes 11 side are provided. Next, in an aspect of the present disclosure, the drop-out member 10 is set according to the predetermined reference position (the reference coordinates of the X and Z axes) through a reference jig.

Subsequently, in an aspect of the present disclosure, the bicycle frame 1 may be provided by bonding both stamp-molded panels by welding, and in this case, the bicycle frame 1 forming the bolt fastening holes 21 at the predetermined positions of the stay frame 20 and forming the convex spherical portion 35 on the bolt fastening holes 21 side is provided.

Next, in an aspect of the present disclosure, the stay frame 20 of the bicycle frame 1 is disposed at the drop-out member 10 side. In this case, in an aspect of the present disclosure, the bolt fastening holes 21 of the stay frame 20 may be target-disposed at the bolt fastening holes 11 of the drop-out member 10.

In this process, in an aspect of the present disclosure, the stay frame 20 is disposed on the drop-out member 10 side and the convex spherical portion 35 of the stay frame 20 is in spherical contact with the concave spherical portion 31 of the drop-out member 10 so that the concave spherical portion 31 of the drop-out member 10 and the convex spherical portion 35 of the stay frame 20 face each other.

Next, in an aspect of the present disclosure, the bolt 8 is inserted into the bolt fastening hole 11 of the drop-out member 10 and the bolt fastening hole 21 of the stay frame 20, and the bolt 8 may be rotated to be fastened with the weld nut 9 inside the stay frame 20. Thus, in an aspect of the present disclosure, the drop-out member 10 may be mounted at the predetermined drop-out mounting unit of the stay frame 20 through the bolt 8.

Here, when manufacturing the bicycle frame 1, in the case that the deformation (the deformation of the X and Z axis directions) of the stay frame 20 is generated by the welding heat, in an aspect of the present disclosure, the concave spherical portion 31 of the drop-out member 10 and the convex spherical portion 35 of the stay frame 20 may not be in complete spherical contact (not entirely spherical-contacted), but are in partial spherical contact by the deformation of the stay frame 20.

Accordingly, in an aspect of the present disclosure, in the state in which the concave spherical portion 31 and the convex spherical portion 35 may be in partial spherical contact by the deformation of the stay frame 20, as the drop-out member 10 is mounted on the stay frame 20 through the bolt 8, the wheel alignment may be performed corresponding to the deformation of the stay frame 20.

Accordingly, in an aspect of the present disclosure, even if the deformation of the stay frame 20 is generated, the wheel alignment may be easily and correctly performed without correction of the stay frame 20 and adjustment of the drop-out member 10.

In an aspect of the present disclosure, when the drop-out member 10 set according to the predetermined reference position is fixed to the stay frame 20 through the bolt 8, the wheel alignment may be easily and correctly performed through the concave spherical portion 31 and the convex spherical portion 35 of the wheel alignment unit 30.

Figure 5:
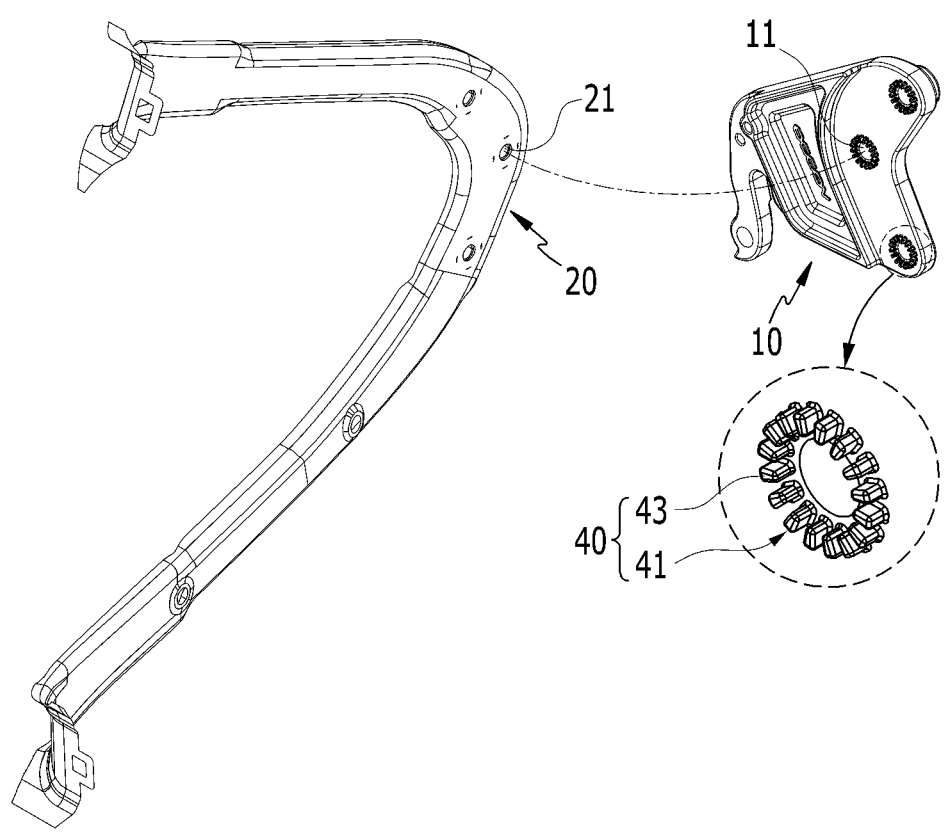
FIG. 5 is an exploded perspective view showing a drop-out mounting structure for wheel alignment according to a second aspect of the present disclosure.
Figure 6:
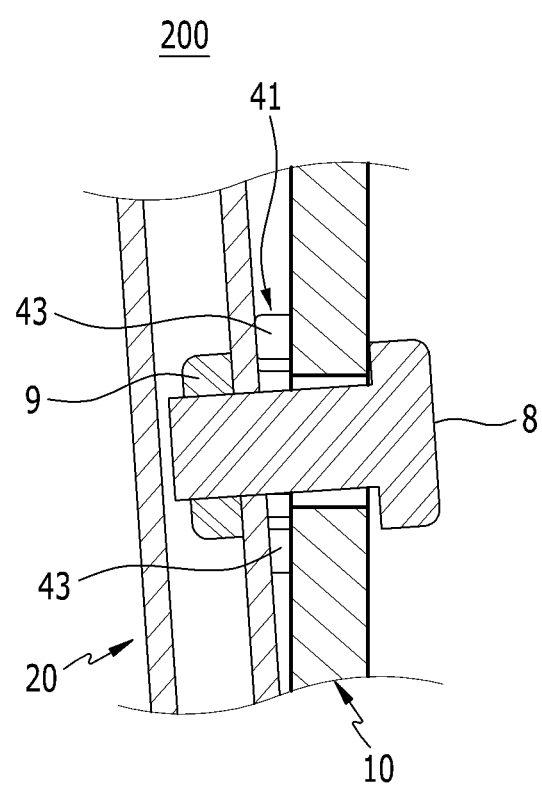
FIG. 6 is an assembled cross-sectional schematic diagram showing a drop-out mounting structure for wheel alignment according to a second aspect of the present disclosure.

FIG. 5 is an exploded perspective view showing a drop-out mounting structure for wheel alignment according to a second aspect of the present disclosure, and FIG. 6 is an assembled cross-sectional schematic diagram showing a drop-out mounting structure for wheel alignment according to a second aspect of the present disclosure. In the drawing, the same configurations as in the previous aspect are indicated by the same reference numerals.

Referring to FIG. 5 and FIG. 6, a drop-out mounting structure 200 for the wheel alignment according to the second aspect of the present disclosure may include a protrusion pattern portion 41 provided between the bolt fastening portions of the drop-out member 10 and the stay frame 20 as a wheel alignment unit 40.

In an aspect of the present disclosure, the protrusion pattern portion 41 of the wheel alignment unit 40 is provided to be partially crushed by the fastening force of the drop-out member 10 and the stay frame 20 by the bolt 8 when the stay frame 20 is deformed.

Since the protrusion pattern portion 41 is integrally formed at the bolt fastening portion of the drop-out member 10 in an aspect of the present disclosure, it is integrally formed to be protruded at the edge surface of the bolt fastening hole 11 on one surface of the drop-out member 10 facing the stay frame 20.

The protrusion pattern portion 41 includes crush protrusions 43 formed to be separately protruded along the edge direction thereof at the edge surface of the bolt fastening hole 11. The crush protrusions 43 may be provided as the protrusions that are crushed by the external force through the drop-out member 10 and the stay frame 20.

Here, the crush protrusions 43 of the protrusion pattern portion 41 are formed to be protruded from the inner side of the drop-out member 10 to the outside of one surface, and for example, the protrusions have a square shape.

In this case, the drop-out member 10 is formed of an aluminum material so that the crush protrusions 43 may be easily crushed by the external force, and the stay frame 20 is formed of a steel material so that the external force is applied to the crush protrusions 43.

Next, the above-configured drop-out mounting structure 200 according to the second aspect of the present disclosure is described in detail with reference to the above-disclosed drawings.

First, an aspect of the present disclosure, the left and right drop-out members 10, in which the axle insertion groove and the bolt fastening holes 11 are formed, and the crush protrusions 43 of the protrusion pattern portion 41, are integrally formed at the bolt fastening holes 11 side, are provided. Next, in an aspect of the present disclosure, the drop-out member 10 may be set according to the predetermined reference position (the reference coordinates of the X and Z axes) through the reference jig.

Subsequently, in an aspect of the present disclosure, the bicycle frame 1 is provided by bonding stamp-molded both panels by the welding, and in this case, the bicycle frame 1 forming the bolt fastening holes 21 at the predetermined position of the stay frame 20 is provided.

Next, in an aspect of the present disclosure, the stay frame 20 of the bicycle frame 1 is disposed at the drop-out member 10 side. In this case, the bolt fastening holes 21 of the stay frame 20 is target-disposed at the bolt fastening holes 11 of the drop-out member 10.

In this process, in an aspect of the present disclosure, the stay frame 20 is target-disposed at the drop-out member 10 side and the crush protrusions 43 is in contact with the bolt fastening hole 21 edge surface of the stay frame 20 so that the crush protrusions 43 of the drop-out member 10 and the bolt fastening hole 21 edge surface of the stay frame 20 face each other.

Next, the bolt 8 may be inserted into the bolt fastening hole 11 of the drop-out member 10 and the bolt fastening hole 21 of the stay frame 20, and may be rotated to be fixed to the weld nut 9 inside the stay frame 20. Thus, in an aspect of the present disclosure, the drop-out member 10 may be mounted at the predetermined drop-out mounting unit of the stay frame 20 through the bolt 8.

Here, when manufacturing the bicycle frame 1, in the case that the deformation (the deformation of the X and Z axes directions) of the stay frame 20 is generated by the welding heat, in an aspect of the present disclosure, the crush protrusions 43 are in partial contact with the bolt fastening holes 21 edge surface of the stay frame 20.

Accordingly, in an aspect of the present disclosure, the part of the crush protrusions 43 in contact with the bolt fastening hole 21 edge surface of the stay frame 20 may be crushed by the fastening force of the drop-out member 10 and the stay frame 20 by the bolt 8.

Also, in an aspect of the present disclosure, since a gap exists between the drop-out member 10 and the stay frame 20 by the deformation of the stay frame 20, the rest of the crush protrusions 43 are disposed in the gap.

That is, in an aspect of the present disclosure, in the state in which the crush protrusions 43 of the protrusion pattern portion 41 are in partial contact with the bolt fastening hole 21 edge surface of the stay frame 20 by the deformation of the stay frame 20, the drop-out member 10 may be mounted at the stay frame 20 through the bolt 8.

Accordingly, in an aspect of the present disclosure, while the part of the crush protrusions 43 is crushed by the fastening force of the drop-out member 10 and the stay frame 20 due to the bolt 8, the wheel alignment may be performed corresponding to the deformation of the stay frame 20.

Accordingly, in an aspect of the present disclosure, even if the deformation of the stay frame 20 is generated, the wheel alignment may be easily and correctly performed without the correction of the stay frame 20 and the adjustment of the drop-out member 10.

That is, in an aspect of the present disclosure, when the drop-out member 10 set according to the predetermined reference position is fixed to the stay frame 20 through the bolt 8, the wheel alignment may be easily and correctly performed through the crush protrusions 43 of the protrusion pattern portion 41.

Figure 7:
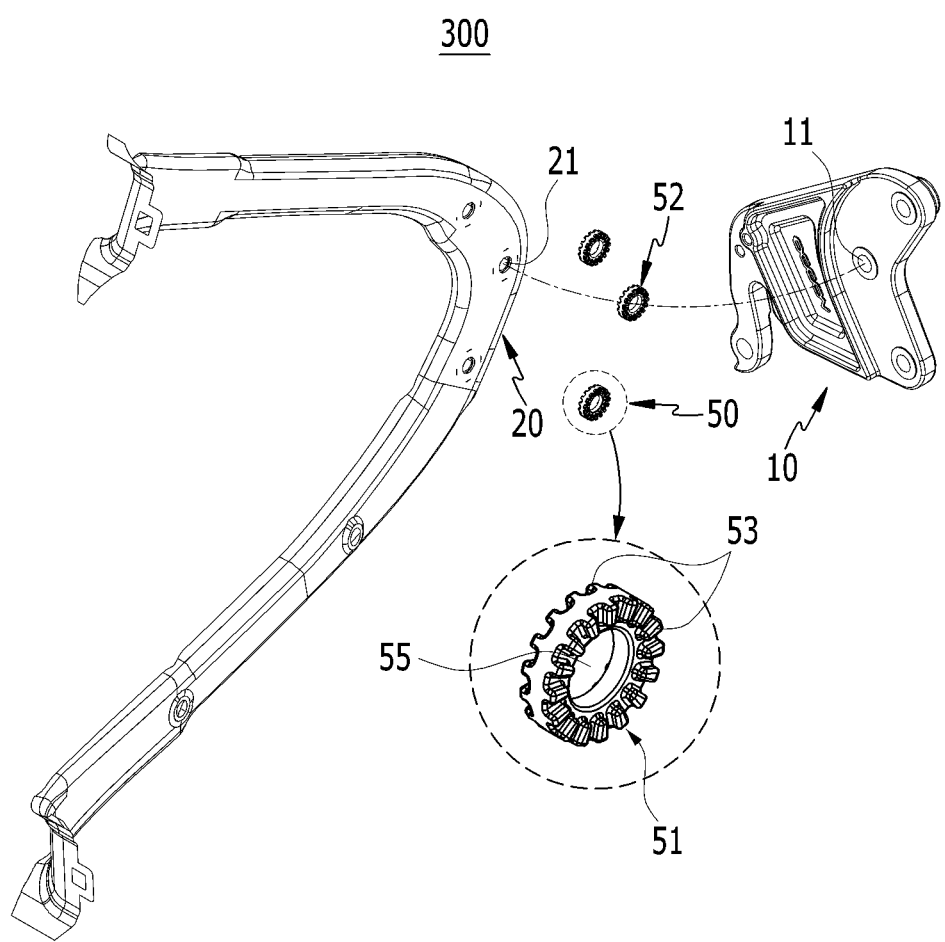
FIG. 7 is an exploded perspective view showing a drop-out mounting structure for wheel alignment according to a third aspect of the present disclosure.
Figure 8:
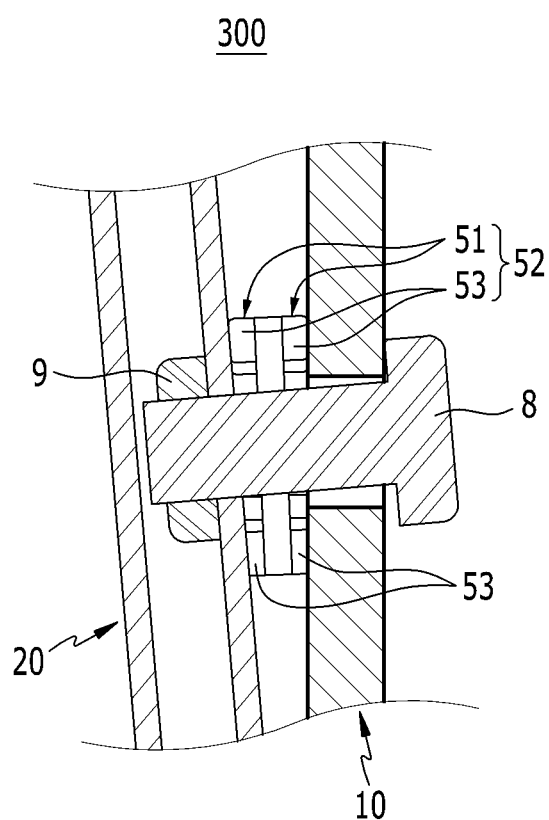
FIG. 8 is an assembled cross-sectional schematic diagram showing a drop-out mounting structure for wheel alignment according to a third aspect of the present disclosure.

FIG. 7 is an exploded perspective view showing a drop-out mounting structure for wheel alignment according to a third aspect of the present disclosure, and FIG. 8 is an assembled cross-sectional schematic diagram showing a drop-out mounting structure for wheel alignment according to the third aspect of the present disclosure. In the drawing, the same configurations as in the previous aspect are indicated by the same reference numerals.

Referring to FIG. 7 and FIG. 8, a drop-out mounting structure 300 for the wheel alignment according to the third aspect of present disclosure may configure a wheel alignment unit 50 including a washer 52 interposed between the drop-out member 10 and the bolt fastening portion of the stay frame 20 and respectively forming a protrusion pattern portion 51 at both side surfaces of the washer 52.

In an aspect of the present disclosure, the washer 52 may be provided with a ring shape forming a washer hole 55 at the center side while passing through the inner space. The washer 52 is disposed between the edge surfaces of the bolt fastening holes 11 and 21 between the bolt fastening holes 11 of the drop-out member 10 and the bolt fastening holes 21 of the stay frame 20, which face each other and are matched.

Also, the protrusion pattern portion 51 may be formed to be integrally protruded at both side surfaces of the washer 52 corresponding to the bolt fastening holes 11 and 21 edge surfaces of the drop-out member 10 and the stay frame 20. The protrusion pattern portion 51 includes crush protrusions 53 formed to be separated and protruded along the edge direction of the washer 52.

The crush protrusions 53 are provided as the protrusions that may be crushed by the external force through the drop-out member 10 and the stay frame 20. The crush protrusions 53 are formed to be protruded from the inside of the washer 52 to both surface outsides, and for example, provided as protrusions with a square shape.

Here, the washer 52 is made of the aluminum material so that the crush protrusions 53 are easily crushed by the external force, and the drop-out member 10 and the stay frame 20 are made of the steel material to apply the external force to the crush protrusions 53.

Next, the above-configured drop-out mounting structure 300 according to the third aspect of the present disclosure is described in detail with reference to the above-disclosed drawings.

First, in an aspect of the present disclosure, the left and right drop-out members 10 forming the axle insertion groove and the bolt fastening holes 11 are provided. Next, in an aspect of the present disclosure, the drop-out member 10 is set according to the predetermined reference position (the reference coordinates of the X and Z axes) through the reference jig.

Subsequently, in an aspect of the present disclosure, the washer 52 forming the crush protrusions 53 of the protrusion pattern portion 51 at both side surfaces is provided. Also, in an aspect of the present disclosure, the bicycle frame 1 is provided by bonding both stamp-molded panels that by the welding, and in this case, the bicycle frame 1 forming the bolt fastening holes 21 at the predetermined position of the stay frame 20 is provided.

Next, in an aspect of the present disclosure, the stay frame 20 of the bicycle frame 1 is disposed at the drop-out member 10 side. In this case, in an aspect of the present disclosure, the bolt fastening holes 21 of the stay frame 20 are target-disposed at the bolt fastening holes 11 of the drop-out member 10.

In this process, the washer 52 may be disposed between the edge surfaces of the bolt fastening holes 11 and 21 of the drop-out member 10 and the stay frame 20 facing each other, and the stay frame 20 is target-disposed at the drop-out member 10 side.

That is, in an aspect of the present disclosure, the crush protrusions 53 of both side surfaces of the washer 52 are in contact with the bolt fastening holes 11 and 21 edge surfaces of the drop-out member 10 and the stay frame 20, and the stay frame 20 is target-disposed at the drop-out member 10 side.

Next, in an aspect of the present disclosure, the bolt 8 is inserted into the bolt fastening hole 11 of the drop-out member 10, the washer hole 55 of the washer 52, and the bolt fastening hole 21 of the stay frame 20, and the bolt 8 is rotated to be fastened with the weld nut 9 of the stay frame 20 inside. Thus, in an aspect of the present disclosure, the drop-out member 10 may be mounted at the predetermined drop-out mounting unit of the stay frame 20 through the bolt 8.

Here, when manufacturing the bicycle frame 1, in the case that the deformation (the deformation of the X and Z axes directions) of the stay frame 20 is generated by the welding heat, the crush protrusions 53 are in partial contact with the bolt fastening holes 11 edge surface of the stay frame 10. The crush protrusions 53 of the other side surface of the washer 52 are in partial contact with the bolt fastening holes 21 edge surface of the stay frame 20.

Accordingly, in an aspect of the present disclosure, the part of the crush protrusions 53 in contact with the bolt fastening holes 11 and 21 edge surfaces of the drop-out member 10 and stay frame 20 is crushed by the fastening force of the drop-out member 10 and the stay frame 20 by the bolt 8.

Also, in an aspect of the present disclosure, since the gap exists between the drop-out member 10 and the stay frame 20 by the deformation of the stay frame 20, the rest of the crush protrusions 53 are disposed in the gap.

That is, in an aspect of the present disclosure, in the state in which the part of the crush protrusions 53 of both side surfaces of the washer 52 is in contact with the bolt fastening holes 11 and 21 edge surfaces of the drop-out member 10 and the stay frame 20 by the deformation of the stay frame 20, the drop-out member 10 may be mounted at the stay frame 20 through the bolt 8.

Accordingly, in an aspect of the present disclosure, while the part of the crush protrusions 53 is crushed by the fastening force of the drop-out member 10 and the stay frame 20 due to the bolt 8, the wheel alignment may be performed corresponding to the deformation of the stay frame 20.

Accordingly, in an aspect of the present disclosure, even if the deformation of the stay frame 20 is generated, the wheel alignment may be easily and correctly performed without the correction of the stay frame 20 and the adjustment of the drop-out member 10.

In an aspect of the present disclosure, when the drop-out member 10 set according to the predetermined reference position is fixed to the stay frame 20 through the bolt 8, the wheel alignment may be easily and correctly performed through the crush protrusions 53 of the protrusion pattern portion 51 provided at both side surfaces of the washer 52.

Figure 9:
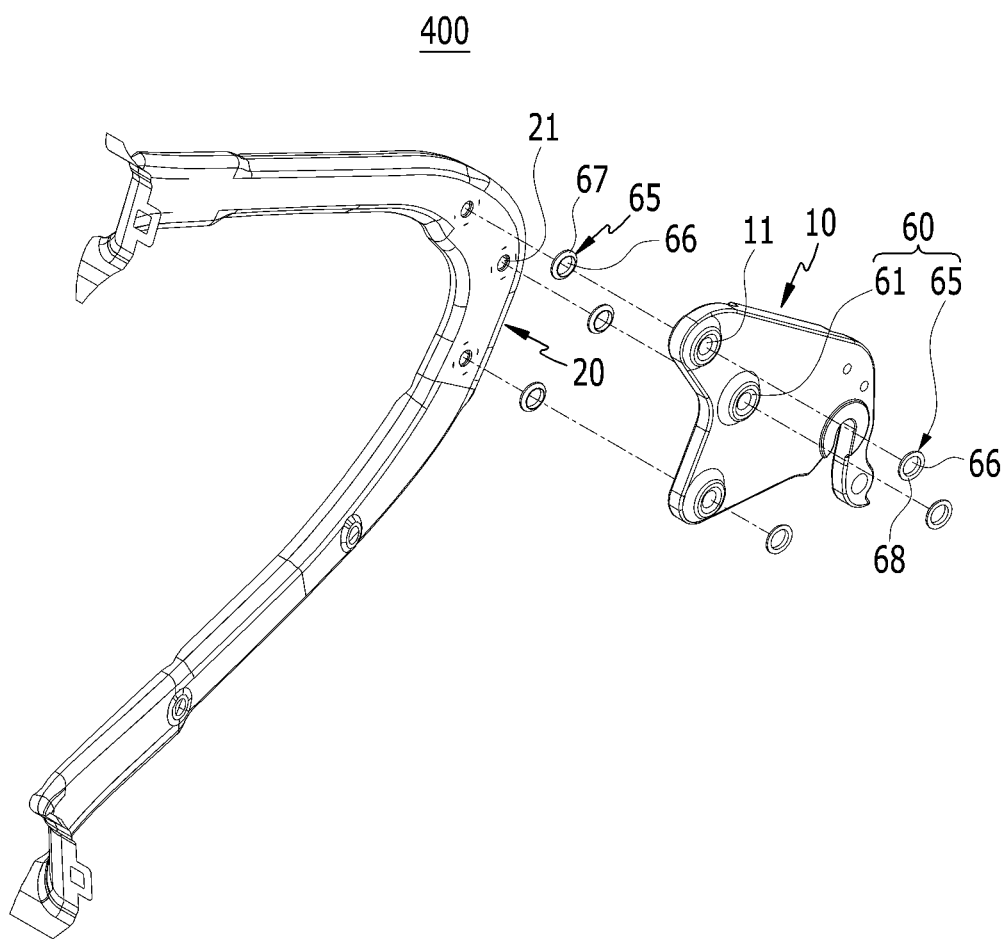
FIG. 9 is exploded perspective view showing a drop-out mounting structure for wheel alignment according to a fourth aspect of the present disclosure.
Figure 10:
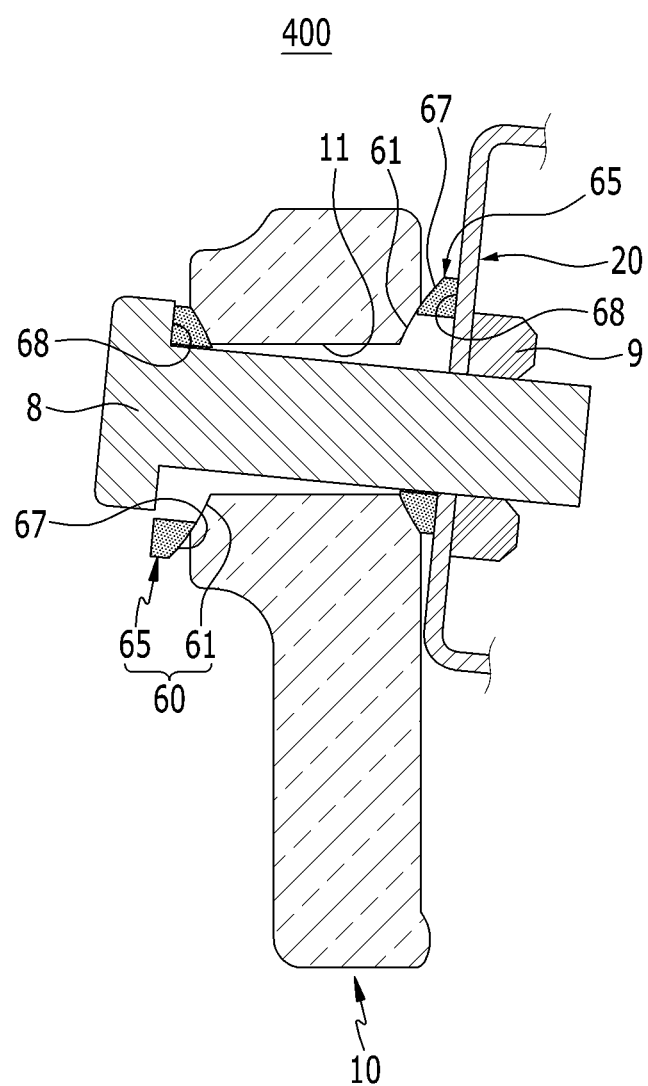
FIG. 10 is an assembled cross-sectional schematic diagram showing a drop-out mounting structure for wheel alignment according to a second aspect of the present disclosure.

FIG. 9 is exploded perspective view showing a drop-out mounting structure for wheel alignment according to a fourth aspect of the present disclosure, and FIG. 10 is an assembled cross-sectional schematic diagram showing a drop-out mounting structure for wheel alignment according to a second aspect of the present disclosure. In the drawings, the same configurations as in the previous aspect are indicated by the same reference numerals.

Referring to FIG. 9 and FIG. 10, a drop-out mounting structure 400 for the wheel alignment according to the fourth aspect of the present disclosure may configure a wheel alignment unit 60 including a concave spherical portion 61 respectively formed at the edge of the bolt fastening holes 11 on both side surfaces of the drop-out member 10 and a washer 65 installed to be in spherical contact with the concave spherical portion 61.

In an aspect of the present disclosure, the concave spherical portion 61 may be formed at the bolt fastening holes 11 edge portions of both side surfaces of the drop-out member 10. The concave spherical portion 61 is formed at the edge portion of the bolt fastening hole 11 corresponding to the head of the bolt 8 on one side surface of the drop-out member 10. Also, the concave spherical portion 61 is formed at the edge portion of the bolt fastening hole 11 of the surface facing the stay frame 20 on the other side surface of the drop-out member 10.

The concave spherical portion 61 forms the spherical surface of the approximate hemisphere shape that is concave from the edge portion of the bolt fastening holes 11 to the inside thereof on both side surfaces of the drop-out member 10.

In an aspect of the present disclosure, the washer 65 is provided as the washer of the ring shape having a washer hole 66 at the center. One washer 65 is disposed at the concave spherical portion 61 side on one side surface of the drop-out member 10.

Also, another washer 65 is disposed at the concave spherical portion 61 side on the other side surface of the drop-out member 10 between the bolt fastening hole 11 of the drop-out member 10 and the bolt fastening hole 21 of the stay frame 20, which face each other and are matched.

In an aspect of the present disclosure, the washers 65 may form a convex spherical portion 67 in spherical contact with each concave spherical portion 61 at one side surface.

The convex spherical portion 67 forms the spherical surface of an approximate hemisphere shape that is convex from the edge portion of the washer hole 66 to the outside and is provided to be in spherical contact with the spherical surface of each concave spherical portion 61 as the male and female type.

Here, one washer 65 forms a flat surface 68 supporting the head portion of the bolt 8 at the other side surface, and another washer 65 forms the flat surface 68 supporting the bolt fastening hole 21 edge of the stay frame 20 at the other side surface.

On the other hand, in an aspect of the present disclosure, the bolt 8 may be fastened with the weld nut 9 provided at the inside of the stay frame 20 by passing through the washer hole 66 of the washer 65 and the bolt fastening holes 11 and 21 of the drop-out member 10 and the stay frame 20.

In this case, the washer hole 66 of the washer 65 and the bolt fastening hole 11 of the drop-out member 10 may be formed with an interior diameter that is larger than an exterior diameter of the bolt 8 (a pitch exterior diameter).

Next, the above-configured drop-out mounting structure 400 according to the fourth aspect of the present disclosure is described in detail with reference to the above-disclosed drawings.

First, in an aspect of the present disclosure, the left and right drop-out members 10 forming the concave spherical portion 61 at the axle insertion groove, the bolt fastening holes 11, and the bolt fastening holes 11 edges of both side surfaces are provided. Next, in an aspect of the present disclosure, the drop-out member 10 is set according to the predetermined reference position (the reference coordinates of the X and Z axes) through the reference jig.

Subsequently, in an aspect of the present disclosure, two washers 65 forming the convex spherical portion 67 at the washer hole 66 edge of one side surface are provided. Also, in an aspect of the present disclosure, the bicycle frame 1 is provided by bonding both stamp-molded panels by the welding, and in this case, the bicycle frame 1 forming the bolt fastening holes 21 at the predetermined position of the stay frame 20 is provided.

Next, in an aspect of the present disclosure, the stay frame 20 of the bicycle frame 1 is disposed at the drop-out member 10 side. In this case, in an aspect of the present disclosure, the bolt fastening holes 21 of the stay frame 20 are target-disposed at the bolt fastening holes 11 of the drop-out member 10.

In this process, in an aspect of the present disclosure, one washer 65 may be disposed at the concave spherical portion 61 of one side surface of the drop-out member 10. Also, in an aspect of the present disclosure, the other washer 65 is disposed at the concave spherical portion 61 of the other side surface of the drop-out member 10 between the facing bolt fastening holes 11 and 21 edges of the drop-out member 10 and the stay frame 20, and the stay frame 20 is target-disposed at the drop-out member 10 side.

Alternatively, in an aspect of the present disclosure, in the state in which the convex spherical portion 67 of the washers 65 is in spherical contact with the concave spherical portion 61 of both side surfaces of the drop-out member 10, the stay frame 20 may be target-disposed at the drop-out member 10 side.

Next, in an aspect of the present disclosure, the bolt 8 is inserted into the bolt fastening hole 11 of the drop-out member 10, the washer hole 66 of the washers 65, and the bolt fastening hole 21 of the stay frame 20.

Also, in an aspect of the present disclosure, the bolt 8 is rotated to be fastened with the weld nut 9 inside the stay frame 20. Thus, in an aspect of the present disclosure, the drop-out member 10 may be mounted at the predetermined drop-out mounting unit of the stay frame 20 through the bolt 8.

In this case, the washer 65 supports the head portion of the bolt 8 through the flat surface 68 at one side surface of the drop-out member 10, and the washer 65 supports the bolt fastening hole 21 edge of the stay frame 20 through the flat surface 68 at the other side surface of the drop-out member 10.

Here, when manufacturing the bicycle frame 1, in the case that the deformation (the deformation of the X and Z axes directions) of the stay frame 20 is generated by the welding heat, in the process of fastening the bolt 8, the washers 65 and the bolt 8 are distorted by the deformation amount of the stay frame 20 and fastened by the fastening force of the drop-out member 10 and the stay frame 20 by the bolt 8.

Since the washer hole 66 of the washer 65 and the bolt fastening hole 11 of the drop-out member 10 may be formed with a larger interior diameter than the exterior diameter of the bolt 8, the washers 65 and the bolt 8 are distorted in one side and fastened while sliding by the deformation amount of the stay frame 20 along the spherical surface of the concave spherical portion 61 in the state that the convex spherical portion 67 of the washer 65 is in spherical contact with the concave spherical portion 61.

Accordingly, in an aspect of the present disclosure, the wheel alignment may be performed corresponding to the deformation of the stay frame 20 while the washers 65 and the bolt 8 are distorted by the deformation amount of the stay frame 20 and fastened through the concave spherical portion 61 by the fastening force of the drop-out member 10 and the stay frame 20 due to the bolt 8.

Accordingly, in an aspect of the present disclosure, even if the deformation of the stay frame 20 is generated, the wheel alignment may be easily and correctly performed without the correction of the stay frame 20 and the adjustment of the drop-out member 10.

Figure 11:
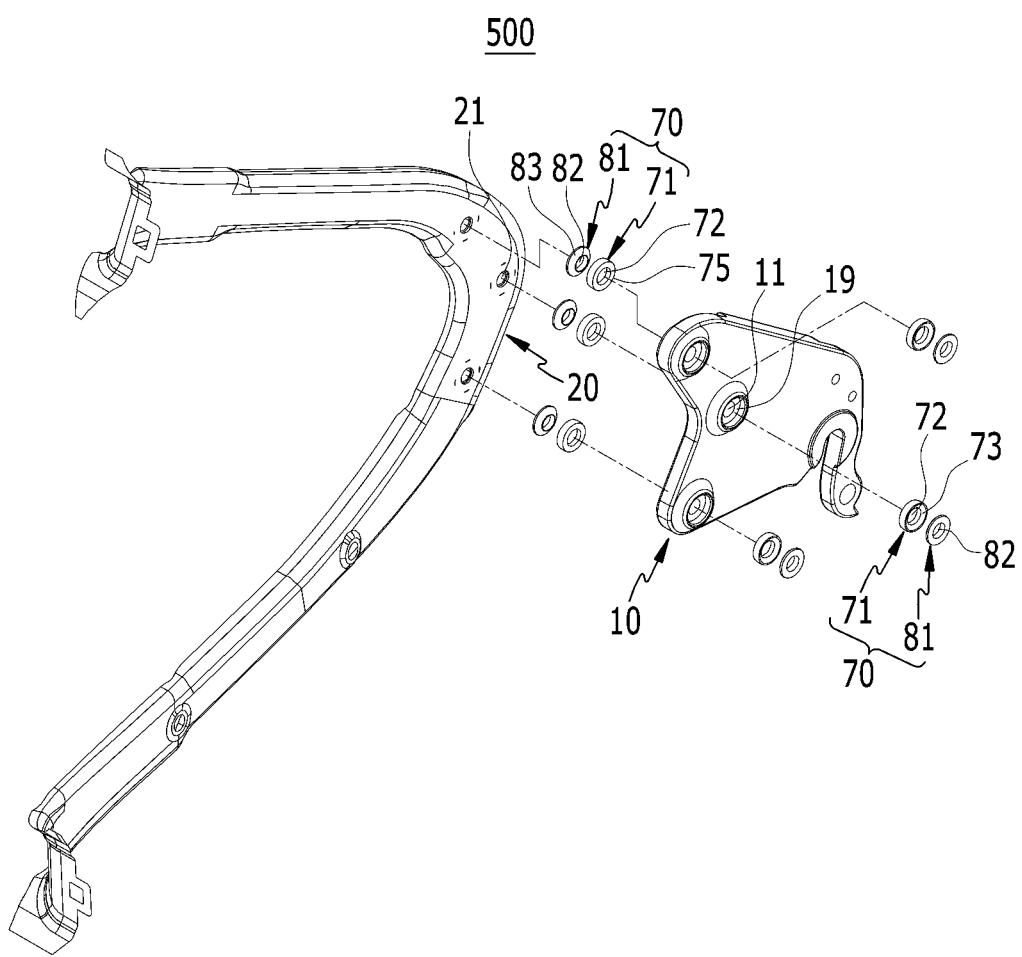
FIG. 11 is exploded perspective view showing a drop-out mounting structure for wheel alignment according to a fifth aspect of the present disclosure.
Figure 12:
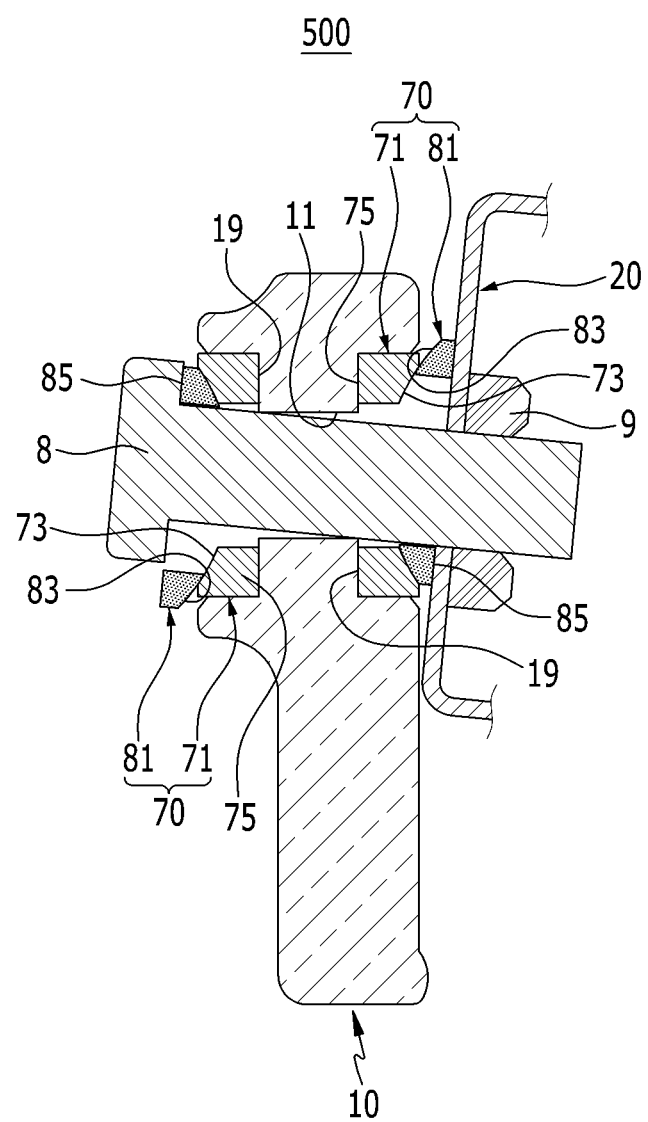
FIG. 12 is an assembled cross-sectional schematic diagram showing a drop-out mounting structure for wheel alignment according to a fifth aspect of the present disclosure.

FIG. 11 is an exploded perspective view showing a drop-out mounting structure for wheel alignment according to a fifth aspect of the present disclosure, and FIG. 12 is an assembled cross-sectional schematic diagram showing a drop-out mounting structure for wheel alignment according to the fifth aspect of the present disclosure. In the drawing, the same configurations as in the previous aspect are indicated by the same reference numerals.

Referring to FIG. 11 and FIG. 12, a drop-out mounting structure 500 for the wheel alignment according to the fifth aspect of the present disclosure may configure a wheel alignment unit 70 having a first washer 71 and a second washer 81 provided at the bolt fastening portion of the drop-out member 10 and the stay frame 20.

In an aspect of the present disclosure, the first washer 71 is respectively installed at a washer mounting surface 19 of the bolt fastening hole 11 edge on both side surfaces of the drop-out member 10. Two first washers 71 are provided as the washer of the ring shape having a washer hole 72 at the center.

The first washers 71 may form a concave spherical portion 73 at the inner edge of one side surface, that is, the edge of the washer hole 72. The concave spherical portion 73 is formed at the washer hole 72 edge of one side surface corresponding to the head portion of the bolt 8 for the first washer 71 disposed at the washer mounting surface 19 on one side surface of the drop-out member 10. Also, the concave spherical portion 73 is formed at the washer hole 72 edge of one side surface corresponding to the bolt fastening hole 21 of the stay frame 20 for the first washer 71 disposed at the washer mounting surface 19 on the other side surface of the drop-out member 10.

The concave spherical portion 73 forms the spherical surface of the approximate hemisphere shape that is concave from the edge portion of the washer hole 72 to the inside thereof on one side surface of the first washer 71.

Here, the first washers 71 form the above-mentioned concave spherical portion 73 at one side surface and a flat surface 75 supporting the washer mounting surface 19 at the other side surface.

In an aspect of the present disclosure, the second washer 81 is installed to be in spherical contact with each concave spherical portion 73 of the first washer 71. Two second washers 81 are provided as the washer of the ring shape having a washer hole 82 at the center.

One second washer 81 is disposed at the concave spherical portion 73 side of the first washer 71 on one side surface of the drop-out member 10. Also, the other second washer 81 is disposed between the bolt fastening holes 11 of the drop-out member 10 and the bolt fastening holes 21 of the stay frame 20, which face each other and are matched, that is, is disposed at the concave spherical portion 73 side of the first washer 71 on the other side surface of the drop-out member 10.

In an aspect of the present disclosure, the second washers 81 forms a convex spherical portion 83 in spherical contact with the concave spherical portion 73 of the first washer 71 at one side surface.

The convex spherical portion 83 is formed at the edge portion of the washer hole 82 on one side surface of the second washer 81 and forms the spherical surface of the approximate hemisphere shape which is convex outside thereof at the edge portion of the washer hole 82, thereby being in spherical contact with the spherical surface of the concave spherical portion 73 of the first washer 71.

Here, one second washer 81 forms a flat surface 85 supporting the head portion of the bolt 8 at the other side surface, and the other second washer 81 forms the flat surface 85 supporting the bolt fastening hole 21 edge of the stay frame 20 at the other side surface.

On the other hand, in an aspect of the present disclosure, the bolt 8 may be fastened to the weld nut 9 provided inside the stay frame 20 while penetrating the washer holes 72 and 82 of the first and second washers 71 and 81 and the bolt fastening holes 11 and 21 of the drop-out member 10 and the stay frame 20.

In this case, the washer holes 72 and 82 of the first and second washers 71 and 81 and the bolt fastening hole 11 of the drop-out member 10 may be formed with a larger interior diameter than the exterior diameter of the bolt 8 (the pitch exterior diameter).

Next, the above-configured drop-out mounting structure 500 according to the fifth aspect of the present disclosure is described in detail with reference to the above-disclosed drawings.

First, in an aspect of the present disclosure, the left and right drop-out members 10 forming the washer mounting surface 19 at the axle insertion groove, the bolt fastening holes 11, and the bolt fastening holes 11 edge side of both side surfaces are provided. Next, in an aspect of the present disclosure, the drop-out member 10 is set according to the predetermined reference position (the reference coordinates of the X and Z axes) through the reference jig.

Subsequently, in an aspect of the present disclosure, two first washers 71 forming the concave spherical portion 73 at the washer hole 72 edge of one side surface and two second washers 81 forming the convex spherical portion 83 at the washer hole 82 edge of one side surface are provided.

Also, in an aspect of the present disclosure, the bicycle frame 1 is provided by bonding both stamp-molded panels by the welding, and in this case, the bicycle frame 1 forming the bolt fastening holes 21 at the predetermined position of the stay frame 20 is provided.

Next, in an aspect of the present disclosure, the stay frame 20 of the bicycle frame 1 is disposed at the drop-out member 10 side. In this case, in an aspect of the present disclosure, the bolt fastening holes 21 of the stay frame 20 are target-disposed at the bolt fastening holes 11 of the drop-out member 10.

In this process, in an aspect of the present disclosure, the first washer 71 is respectively disposed at the washer mounting surface 19 on both side surfaces of the drop-out member 10. Here, the flat surface 75 of the first washer 71 supports the washer mounting surface 19.

Also, in an aspect of the present disclosure, the second washer 81 is disposed at the concave spherical portion 73 of each first washer 71. In this case, in an aspect of the present disclosure, one second washer 81 is target-disposed at the concave spherical portion 73 of the first washer 71 on one side surface of the drop-out member 10.

Also, in an aspect of the present disclosure, the other second washer 81 is target-disposed at the concave spherical portion 73 of the first washer 71 disposed on the other side surface of the drop-out member 10 between the bolt fastening holes 11 and 21 edges of the drop-out member 10 and stay frame 20 facing each other.

Alternatively, in an aspect of the present disclosure, in the state that the convex spherical portion 83 of the second washers 81 is in spherical contact with the concave spherical portion 73 of the first washer 71, the stay frame 20 may be target-disposed at the drop-out member 10 side.

Next, in an aspect of the present disclosure, the bolt 8 is inserted into the bolt fastening hole 11 of the drop-out member 10, the washer holes 72 and 82 of the first and second washers 71 and 81, and the bolt fastening hole 21 of the stay frame 20.

Also, in an aspect of the present disclosure, the bolt 8 is rotated to be fastened with the weld nut 9 inside the stay frame 20. Thus, in an aspect of the present disclosure, the drop-out member 10 may be mounted at the predetermined drop-out mounting unit of the stay frame 20 through the bolt 8.

In this case, the second washer 81 supports the head portion of the bolt 8 through the flat surface 85 on one side surface of the drop-out member 10, and the second washer 81 supports the bolt fastening hole 21 edge of the stay frame 20 through the flat surface 85 on the other side surface of the drop-out member 10.

Here, when manufacturing the bicycle frame 1, in the case that the deformation (the deformation of the X and Z axis directions) of the stay frame 20 is generated by the welding heat, in the process of fastening the bolt 8, the second washers 81 and the bolt 8 are distorted and fastened by the deformation amount of the stay frame 20 by the fastening force of the drop-out member 10 and the stay frame 20 due to the bolt 8.

Since the washer holes 72 and 82 of the first and second washers 71 and 81 and the bolt fastening hole 11 of the drop-out member 10 are formed with the larger interior diameter than the exterior diameter of the bolt 8, in the state that the convex spherical portion 83 of the second washer 81 is in spherical contact with the concave spherical portion 73 of the first washer 71, the second washers 81 and the bolt 8 are distorted in one side and fastened while sliding along the spherical surface of the concave spherical portion 73 by the deformation amount of the stay frame 20.

Accordingly, in an aspect of the present disclosure, the wheel alignment may be performed corresponding to the deformation of the stay frame 20 while the second washers 81 and the bolt 8 are distorted and fastened by the deformation amount of the stay frame 20 through the concave spherical portion 73 of the first washer 71 by the fastening force of the drop-out member 10 and the stay frame 20 due to the bolt 8.

Accordingly, in an aspect of the present disclosure, even if the deformation of the stay frame 20 is generated, the wheel alignment may be easily and correctly performed without the correction of the stay frame 20 and the adjustment of the drop-out member 10.

As described so far, according to the drop-out mounting structure for the wheel alignment according to the aspects of the present disclosure, when mounting the drop-out member 10 to the stay frame 20 through the bolt 8 in the state that the drop-out member 10 is set according to the predetermined reference position through the reference jig, the wheel alignment may be performed through the wheel alignment units 30, 40, 50, 60, and 70.

Accordingly, in the aspects of the present disclosure, when manufacturing the bicycle frame 1, even if the stay frame 20 is deformed by the welding heat, the wheel alignment may be easily and correctly performed through the wheel alignment units 30, 40, 50, 60, and 70 without the separate correction of the stay frame 20 and the separate adjustment of the drop-out member 10.

Accordingly, in the aspects of the present disclosure, the loss of the power transmitted to the wheel may be reduced, the uneven wear of the tire may be reduced, and the damage to the bicycle frame 1 due to the fatigue endurance in a one-sided direction may be reduced.

Also, in the aspects of the present disclosure, in the bicycle frame 1, it is possible to produce a substantially uniform product regardless of thermal deformation by the welding when manufacturing the bicycle frame 1, and a work amount for the wheel alignment quality may be reduced when assembling the drop-out member 10 and the stay frame 20, thereby improving the assembling productivity of the bicycle.

Furthermore, in the aspects of the present disclosure, it is possible to inhibit warpage of the bicycle frame 1 due to external impact, it is possible to obtain a substantially uniform quality of the wheel alignment, and the endurance quality of the bicycle frame 1 may be improved by the setting of the wheel alignment.

While this disclosure has been described in connection with practical aspects, it is to be understood that the disclosure is not limited to the disclosed aspects, but, on the contrary, covers various modifications and equivalent arrangements included within the spirit and scope of the present disclosure.

<Description of symbols>

| | |
|---|---|
| 1: bicycle frame | 2: head tube |
| 3: seat tube | 4: top tube |
| 5: down tube | 6: seat stay |
| 7: chain stay | 8: bolt |
| 9: nut | 10: drop-out member |
| 11, 21: bolt fastening hole | 19: washer mounting surface |
| 20: stay frame | |
| 30, 40, 50, 60, 70: wheel alignment unit | |
| 31, 61, 73: concave spherical portion | 35, 67, 83: convex spherical portion |
| 41, 51: protrusion pattern portion | 43, 53: crush protrusion |
| 52, 65: washer | 55, 66, 72, 82: washer hole |
| 68, 75, 85: flat surface | 71: first washer |
| 81: second washer | |

What is claimed is:

1. A drop-out mounting structure mounting a drop-out member as a wheel mounting unit to a bicycle frame through a bolt in a state that the drop-out member is set according to a predetermined reference position, comprising
a wheel alignment unit provided to be in spherical contact with a bolt fastening portion of the drop-out member and the frame as a male and female type and performing wheel alignment according to deformation of the frame,
wherein the wheel alignment unit includes:
a concave spherical portion formed at one bolt fastening hole edge of the drop-out member and the frame; and
a convex spherical portion formed at another bolt fastening hole edge of the drop-out member and the frame and in spherical contact with the concave spherical portion.

2. The drop-out mounting structure of claim 1, wherein the drop-out member is mounted at a stay frame of the bicycle frame in which both side panels that are stamp-molded are bonded by welding.

3. The drop-out mounting structure of claim 1, wherein the convex spherical portion is in partial spherical contact with the concave spherical portion by the deformation of the frame.

4. A drop-out mounting structure mounting a drop-out member as a wheel mounting unit to a bicycle frame through a bolt in a state that the drop-out member is set according to a predetermined reference position, comprising
a wheel alignment unit provided between bolt fastening portions of the drop-out member and the frame and performing wheel alignment according to deformation of the frame,
wherein the wheel alignment unit includes a protrusion pattern portion of which a part is crushed by a fastening force of the drop-out member and the frame due to the bolt.

5. The drop-out mounting structure of claim 4, wherein the protrusion pattern portion includes crush protrusions formed to be integrally protruded and separated along an edge direction at a bolt fastening hole edge surface of the drop-out member.

6. The drop-out mounting structure of claim 4, wherein the frame is made of a steel material, and the drop-out member is made of an aluminum material.

7. The drop-out mounting structure of claim 4, wherein the wheel alignment unit includes a washer interposed between bolt fastening portions of the drop-out member and the frame and the protrusion pattern portion is respectively formed at both side surfaces of the washer.

8. The drop-out mounting structure of claim 7, wherein the frame and the drop-out member are made of a steel material, and
the washer is made of an aluminum material and is provided in a ring shape having an inner space.

9. The drop-out mounting structure of claim 7, wherein the protrusion pattern portion includes crush protrusions formed to be integrally protruded and separated along an edge direction at both side surfaces of the washer.

10. A drop-out mounting structure mounting a drop-out member as a wheel mounting unit to a bicycle frame through a bolt in a state that the drop-out member is set according to a predetermined reference position, comprising
a wheel alignment unit provided at bolt fastening portions of the drop-out member and the frame and performing wheel alignment according to deformation of the frame,
wherein the wheel alignment unit includes a concave spherical portion respectively formed at a bolt fastening hole edge on both side surfaces of the drop-out member and a washer installed to be in spherical contact with the concave spherical portion.

11. The drop-out mounting structure of claim 10, wherein the washer forms a convex spherical portion in spherical contact with the concave spherical portion at one side surface.

12. The drop-out mounting structure of claim 11, wherein one washer forms a flat surface supporting a head of the bolt at the other side surface, and
another washer forms the flat surface supporting the bolt fastening hole edge of the frame at the other side surface.

13. The drop-out mounting structure of claim 10, wherein the bolt is fastened to a weld nut provided at the inside of the frame by penetrating a washer hole of the washer and the bolt fastening hole of the drop-out member and the frame, and
the washer hole of the washer and the bolt fastening hole of the drop-out member are formed with a larger interior diameter than an exterior diameter of the bolt.

14. The drop-out mounting structure of claim 10, wherein the washer includes a first washer respectively installed at a washer mounting surface of the bolt fastening hole edge side on both side surfaces of the drop-out member and forming a concave spherical portion at an inner edge and a second washer installed to be in spherical contact with a concave spherical portion of each first washer.

15. The drop-out mounting structure of claim 14, wherein the first washer forms the concave spherical portion at one side surface and a flat surface supporting the washer mounting surface at the other side surface.

16. The drop-out mounting structure of claim 14, wherein the second washer forms a convex spherical portion in spherical contact with the concave spherical portion of the first washer at one side surface.

17. The drop-out mounting structure of claim 16, wherein one second washer forms the flat surface supporting a head of the bolt at the other side surface, and
the other second washer forms the flat surface supporting a bolt fastening hole edge of the frame at the other side surface.

18. The drop-out mounting structure of claim 14, wherein the bolt is fastened to a weld nut provided at the inside of the frame by penetrating the washer hole of the first and second washers and the bolt fastening hole of the drop-out member and the frame, and
a washer hole of the first and second washers and the bolt fastening hole of the drop-out member are formed with a larger interior diameter than an exterior diameter of the bolt.

19. The drop-out mounting structure of claim 14, wherein the drop-out member forms the bolt fastening hole disposed in a triangle structure.

* * * * *